(12) United States Patent
Kitano et al.

(10) Patent No.: US 9,115,683 B2
(45) Date of Patent: Aug. 25, 2015

(54) ENGINE STARTING DEVICE

(75) Inventors: Hiroaki Kitano, Tokyo (JP); Takashi Iwasaki, Tokyo (JP); Masahiko Kurishige, Tokyo (JP); Koichiro Kamei, Tokyo (JP); Kazuhiro Odahara, Tokyo (JP); Naohito Kaneda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 474 days.

(21) Appl. No.: 13/516,249

(22) PCT Filed: Oct. 26, 2010

(86) PCT No.: PCT/JP2010/006328
§ 371 (c)(1),
(2), (4) Date: Jun. 15, 2012

(87) PCT Pub. No.: WO2011/092765
PCT Pub. Date: Aug. 4, 2011

(65) Prior Publication Data
US 2012/0260878 A1    Oct. 18, 2012

(30) Foreign Application Priority Data

Jan. 26, 2010  (JP) ................................ 2010-014278

(51) Int. Cl.
*F02D 41/08* (2006.01)
*F02N 11/08* (2006.01)
*B60W 30/18* (2012.01)

(52) U.S. Cl.
CPC ...... *F02N 11/0855* (2013.01); *B60W 30/18018* (2013.01); *F02N 2200/022* (2013.01); *F02N 2200/041* (2013.01)

(58) Field of Classification Search
CPC .... F02D 41/062; F02D 41/08; F02N 11/0803
USPC ......... 701/54, 101, 102, 112, 113; 123/179.3, 123/179.4, 179.25
See application file for complete search history.

(56) References Cited

U.S. PATENT DOCUMENTS 5,669,358 A * 9/1997 Osakabe ........................ 123/509
5,724,936 A * 3/1998 Osakabe .................. 123/198 R
(Continued)

FOREIGN PATENT DOCUMENTS

CN         101432519 A      5/2009
JP         2001 159347      6/2001
(Continued)

OTHER PUBLICATIONS

International Search Report Issued Nov. 30, 2010 in PCT/JP10/06328 Filed Oct. 26, 2010.
Combined Chinese Office Action and Search Report issued Mar. 19, 2014 in Patent Application No. 201080062392.4 (with English translation of the Office Action and English translation of categories of cited documents).

*Primary Examiner* — John Kwon
(74) *Attorney, Agent, or Firm* — Oblon, McClelland, Maier & Neustadt, L.L.P.

(57) ABSTRACT

A ring gear to be coupled to a crankshaft of an engine; a starter motor for starting the engine; a pinion gear for transmitting rotation of the starter motor to the ring gear; pinion-gear meshing-engagement unit for moving the pinion gear to achieve meshing engagement with the ring gear; rpm-difference acquiring unit for acquiring an rpm difference between the pinion gear and the ring gear; and restart control unit for allowing the pinion gear to be moved by the pinion-gear meshing-engagement unit when the rpm difference between the pinion gear and the ring gear, which is acquired by the rpm-difference acquiring unit, becomes smaller than a threshold value are provided. The restart control unit includes threshold-value setting unit, and the threshold value corresponding to a characteristic to be input to the threshold-value setting unit is preset.

19 Claims, 13 Drawing Sheets

(56) References Cited

U.S. PATENT DOCUMENTS

| | | | |
|---|---|---|---|
| 6,834,630 B1* | 12/2004 | Mueller et al. | 123/179.25 |
| 8,290,692 B2* | 10/2012 | Kitano et al. | 701/113 |
| 2006/0043795 A1* | 3/2006 | Eguchi et al. | 307/10.1 |
| 2007/0137602 A1 | 6/2007 | Kassner | |
| 2008/0115753 A1 | 5/2008 | Noguchi | |
| 2009/0241883 A1* | 10/2009 | Nagoshi et al. | 123/179.4 |
| 2010/0256896 A1 | 10/2010 | Kitano et al. | |
| 2012/0103294 A1* | 5/2012 | Kitano et al. | 123/179.25 |
| 2012/0199090 A1 | 8/2012 | Kitano et al. | |
| 2012/0209480 A1* | 8/2012 | Hamane et al. | 701/54 |

FOREIGN PATENT DOCUMENTS

| | | |
|---|---|---|
| JP | 2002 70699 | 3/2002 |
| JP | 2005 330813 | 12/2005 |
| JP | 2007 107527 | 4/2007 |
| JP | 2008 106720 | 5/2008 |

* cited by examiner

ENGINE STARTING DEVICE

TECHNICAL FIELD

The present invention relates to an engine starting device for an automatic idle-stop system for performing an engine idle stop when predetermined idle-stop conditions are satisfied and restarting the engine when a restart condition is thereafter satisfied.

BACKGROUND ART

Conventionally, for the purposes of improving fuel efficiency and reducing an environmental load of automobiles, there have been developed automatic idle-stop systems for automatically performing an idle stop with the satisfaction of predetermined conditions. Among the automatic idle-stop systems, an automatic idle-stop system using a starter is advantageous in that a change in system of a vehicle is small and cost is low, while having a problem in that meshing engagement cannot be achieved before an engine is completely stopped.

To cope with the problem described above, there exists an automatic idle-stop system in which a starter motor rpm is brought into synchronization with an engine rpm by energization with speed governing at the time of restart of the engine and a pinion gear is then pushed out to achieve the meshing engagement at the time when an rpm difference becomes smaller than a predetermined threshold value (for example, see Patent Literature 1).

In addition, there is another automatic idle-stop system which predicts a future ring-gear rpm to predict a time at which a pinion gear rpm comes into synchronization with the future ring-gear rpm, so as to control a push-out timing or push-out speed of the pinion gear for synchronization with the above-mentioned time (for example, see Patent Literature 2).

CITATION LIST

Patent Literature

[PTL 1]: JP 2002-070699 A
[PTL 2]: JP 2005-330813 A

SUMMARY OF INVENTION

Technical Problem

The invention described above in Patent Literature 1 or 2 provides a system which obviously enables a quick restart of the engine as compared with conventional systems which perform restart control after waiting for the determination of complete stop of the rotation of the engine.

In Patent Literature 1 described above, however, means for energizing the starter with speed governing is additionally required for duty control or the like, which may lead to increased cost. In Patent Literature 2 described above, it is necessary to predict the ring-gear rpm at least over a predetermined length of time or constantly on line because the future ring-gear rpm is predicted so as to predict the time at which the pinion rpm comes into synchronization. Therefore, in some case, replacement to a high-performance engine electronic control unit (hereinafter, referred to as "ECU") is additionally required, which may lead to an increase in cost. Further, the future rpm is predicted. Therefore, if noise is generated in a parameter used for prediction, there is a fear in that the predicted rpm significantly differs from an actual value.

The present invention has been made to solve the problem described above, and therefore has an object to provide an engine starting device which enables meshing engagement between a pinion gear and a ring gear to be quickly and quietly achieved during the rotation of an engine by inertia in an automatic idle-stop system without requiring a large computation load or an increase in cost.

Solution to Problem

According to the present invention, there is provided an engine starting device for an automatic idle-stop system for performing an idle stop when an idle-stop condition is satisfied, the engine starting device including: a ring gear to be coupled to a crankshaft of the engine; a starter motor for starting the engine; a pinion gear for transmitting rotation of the starter motor to the ring gear; rpm-difference acquiring means for acquiring an rpm difference between the pinion gear and the ring gear; pinion-gear meshing-engagement means for moving the pinion gear to achieve meshing engagement with the ring gear; and restart control means for allowing the pinion gear to be moved by the pinion-gear meshing-engagement means when the rpm difference between the pinion gear and the ring gear, which is acquired by the rpm-difference acquiring means, becomes smaller than a threshold value. The restart control means includes threshold-value setting means, and the threshold value corresponding to a characteristic to be input to the threshold-value setting means is preset.

Advantageous Effects of Invention

According to the present invention, the meshing engagement between the pinion gear and the ring gear is quickly and quietly achieved. As a result, a feeling of discomfort is not given to a driver. Further, a reduction in noise at the time of meshing engagement and a longer lifetime of components can be achieved.

REFERENCE SIGNS LIST

10 engine ECU; 11 ring gear; 12 crank-angle sensor; 13 controller; 14 pinion gear; 15 plunger; 16 solenoid; 17 starter motor; 18 timer; 19 starter; 20 engine starting device; 21 engine-rpm acquiring means; 22 pinion-gear meshing-engagement means

DESCRIPTION OF EMBODIMENT

Embodiment 1

Figure 1:
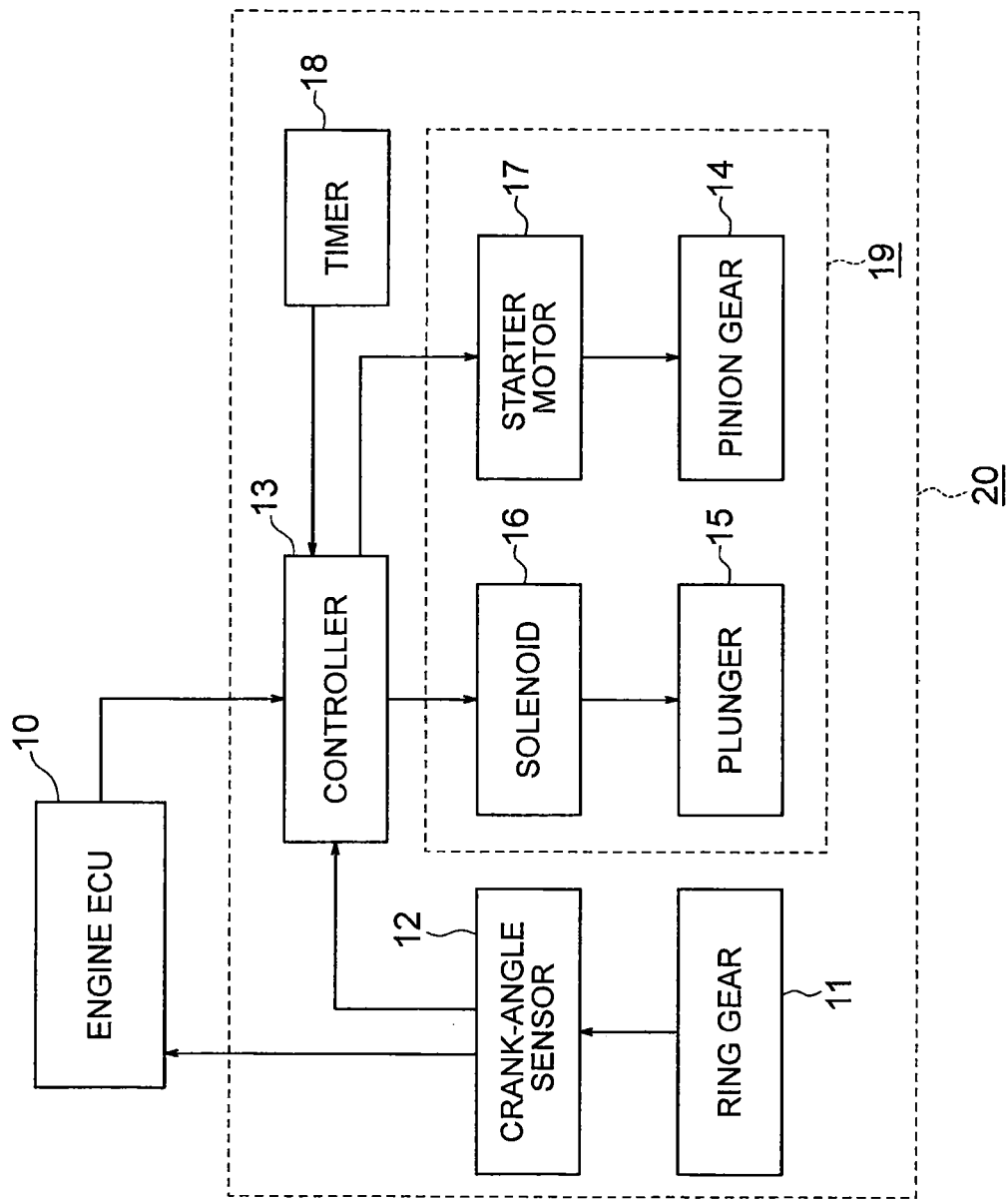
FIG. 1 is a block diagram illustrating a schematic configuration of an engine starting device according to Embodiment 1 of the present invention.

FIG. 1 is a block diagram illustrating a schematic configuration of an engine starting device according to Embodiment 1 of the present invention. In FIG. 1, an engine ECU 10 determines whether or not idle-stop conditions (for example, a vehicle speed is equal to or lower than 5 km/h, a driver is pressing down a brake, and the like) are satisfied, and then inputs the result of determination to a controller 13 of an engine starting device 20. The engine starting device 20 includes a ring gear 11 coupled to a crankshaft (not shown) of an engine, a crank-angle sensor 12 for detecting a crank angle of the engine, a starter 19, a controller 13 for controlling energization of a starter motor 17 and a solenoid 16, a timer 18 for detecting a time period from the start of energization of the starter motor 17, and a second data table Tb2 (not shown) having the time period from the start of the energization as an input and a pinion-gear rpm Np as an output in accordance with rising characteristics of the starter motor 17. The starter 19 includes the starter motor 17, a pinion gear 14 for transmitting the rotation of the starter motor 17, a plunger 15 for pushing out the pinion gear 14 to achieve meshing engagement with the ring gear 11, and the solenoid 16 capable of moving the plunger 15 by energization. Through the control of the energization by the controller 13, the energization of the starter motor 17 and the energization of the solenoid 16 can be independently controlled.

For the restart of the engine, the controller 13 includes a data table Tb1 (not shown) which uses the crank angle, the engine rpm, and the pinion-gear rpm as inputs to output an rpm-difference threshold value Ndiff for determining the energization of the solenoid 16.

In the embodiment of the present invention, the crank angle is described as degrees before top dead center (BTDC).

An engine rpm Nr is computed by the controller 13 based on a sensor input cycle from the crank-angle sensor 12. However, a rotary encoder, a pulse generator which is capable of detecting pulses of teeth of the ring gear, or the like may be provided instead so as to detect the engine rpm Nr by using another means using frequency-voltage (FV) conversion or the like of a signal therefrom.

Also for the pinion-gear rpm Np, a current pinion-gear rpm is estimated based on the time period from the start of energization. However, the pinion gear rpm may be directly detected by a pinion-gear rpm sensor using a hall element or the like. Besides the pinion-gear rpm sensor, the pinion-gear rpm Np may be detected by using another means such as an rpm table corresponding to a voltage applied to or a current of the starter motor 17.

Note that, the controller 13 and the engine ECU 10 are illustrated as being separate from each other in FIG. 1, but the engine ECU 10 may perform processing instead of providing the controller 13. Therefore, the engine starting device 20 may include the engine ECU 10.

Figure 2:
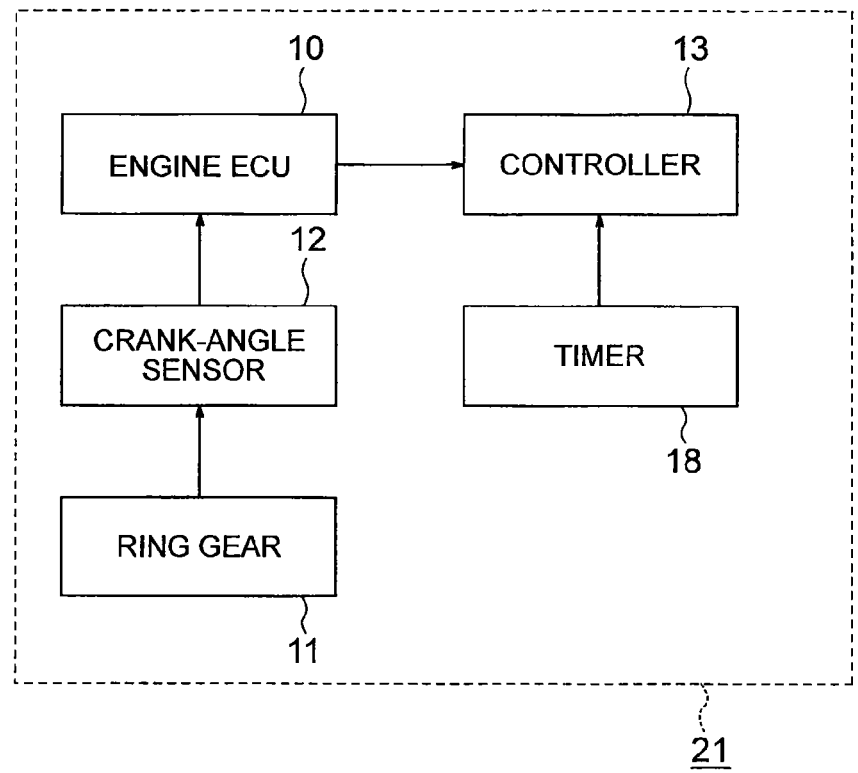
FIG. 2 is a block diagram illustrating a schematic configuration of rpm-difference acquiring means according to Embodiment 1 of the present invention.
Figure 3:
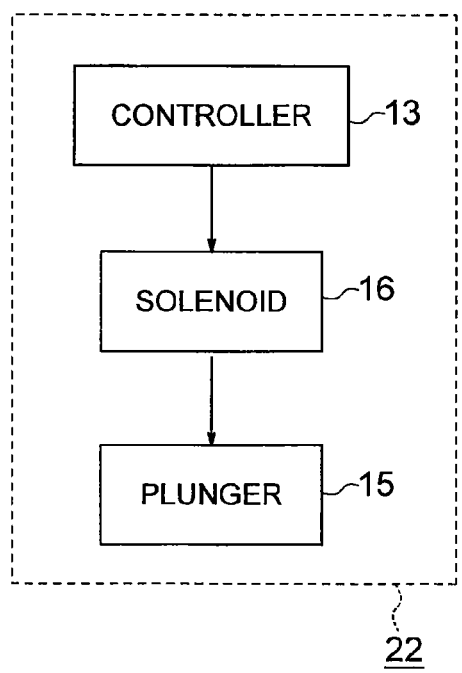
FIG. 3 is a block diagram illustrating a schematic configuration of pinion push-out means according to Embodiment 1 of the present invention.

Moreover, the controller 13 and the engine ECU 10, or any one thereof constitute(s) restart control means. The controller 13 and the engine ECU 10 or any one thereof, the crank-angle sensor 12, the ring gear 11, and the timer 18 constitute rpm-difference acquiring means 21 (FIG. 2). The controller 13 and the engine ECU 10 or any one thereof, the plunger 15, and the solenoid 16 constitute pinion-gear meshing-engagement means 22 (FIG. 3).

In general, the pinion gear 14 has a smaller number of teeth than that of the ring gear 11. However, for avoiding confusion, an rpm obtained by conversion into the rpm of the ring gear in view of a ratio of the number of teeth of the pinion gear to that of the ring gear is used as each of the pinion-gear rpm and the engine rpm in this embodiment.

Figure 4:
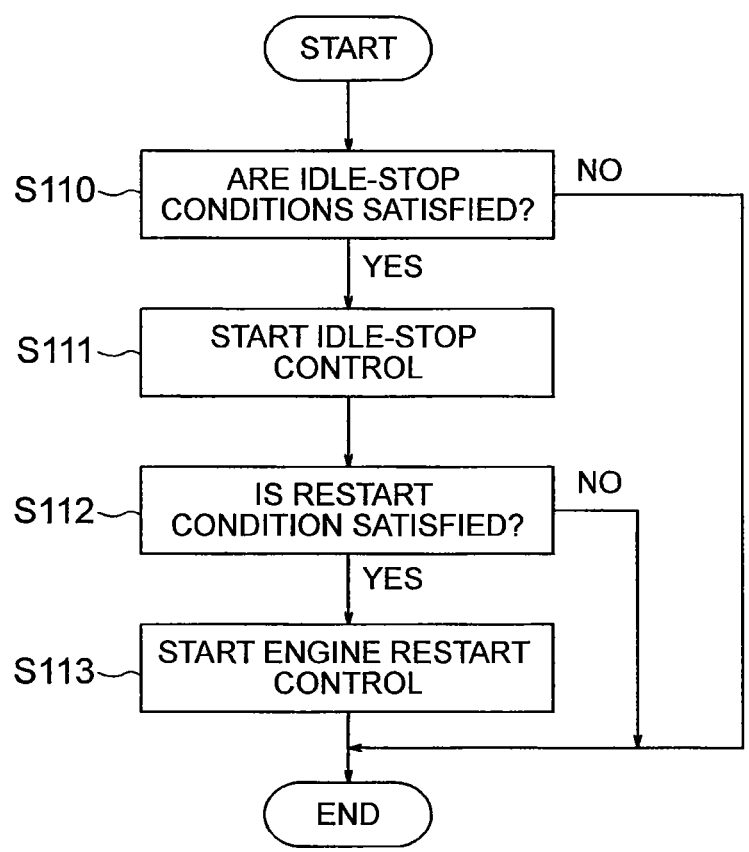
FIG. 4 is a flowchart illustrating a flow of idle-stop control according to Embodiment 1 of the present invention.
Figure 5:
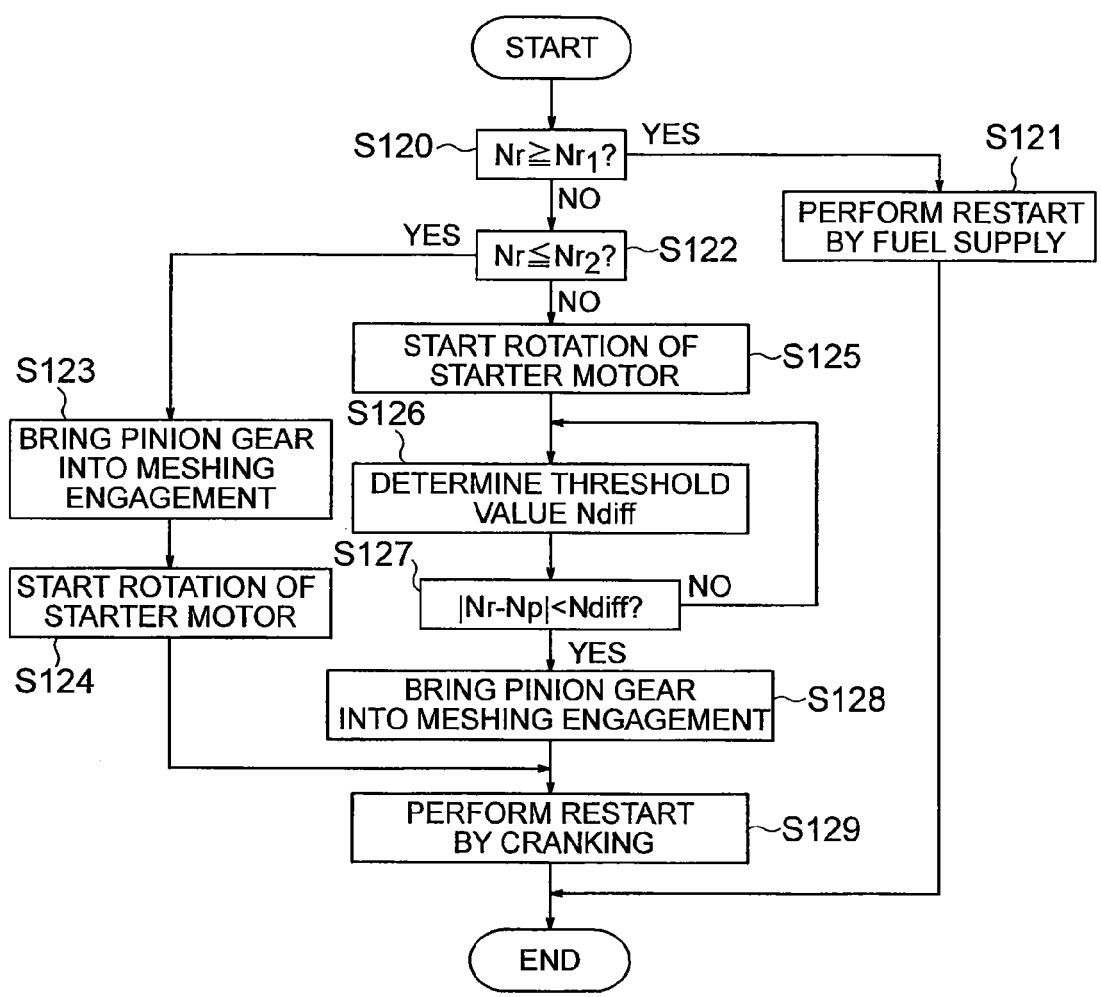
FIG. 5 is a flowchart illustrating a flow of engine restart control according to Embodiment 1 of the present invention.

Next, an operation of Embodiment 1 is described with reference to FIGS. 4 and 5. FIGS. 4 and 5 are flowcharts illustrating processing performed in the controller 13 and that performed in the engine ECU 10 in Embodiment 1.

First, in the engine ECU 10, it is determined whether or not the idle-stop conditions are satisfied (S110). When the idle-stop conditions are not satisfied, the processing proceeds to a next control cycle. When the idle-stop conditions are satisfied in Step S110, the idle-stop control is started (S111) so as to stop fuel supply to the engine by control performed by the engine ECU 10. Then, while the engine rpm is dropping by the rotation of the engine by inertia, it is determined based on a signal to the engine ECU 10 whether or not an engine restart condition (for example, the driver releases a foot from a brake pedal or the like) is satisfied (S112). When the restart condition is satisfied, the processing proceeds to Step S113. When the restart condition is not satisfied, the processing proceeds to a next control cycle.

In Step S113, engine restart control is started.

Next, with reference to FIG. 5, the engine restart control is described.

First, in Step S120, it is determined whether or not the engine rpm Nr is equal to or larger than an engine self-recoverable rpm $Nr_1$ (for example, 700 rpm).

Here, "engine self-recoverable" means that the restart can be performed only by injecting and igniting a fuel without performing cranking with the starter 19. For example, there is control for injecting a larger amount of fuel to achieve an easy combustion or the like. The details of the control of the engine self-recovery are not described herein.

When it is determined in Step S120 that the engine rpm Nr is equal to or larger than the engine self-recoverable rpm $Nr_1$, the processing proceeds to Step S121, in which the restart by the fuel supply described above is performed to restart the engine. When it is determined in Step S120 that the engine rpm is smaller than the engine self-recoverable rpm $Nr_1$, the processing proceeds to Step S122.

In Step S122, it is determined whether or not the engine rpm Nr is equal to or smaller than a meshing-engagement allowing rpm $Nr_2$ at which the ring gear 11 and the pinion gear 14 can come into meshing engagement with each other without rotating the starter motor 17.

When it is determined in Step S122 that the engine rpm Nr is equal to or smaller than the meshing-engagement rpm allowing $Nr_2$, the processing proceeds to Step S123, in which the plunger 15 is moved by energizing the solenoid 16 to push out the pinion gear 14 so as to achieve the meshing engagement between the pinion gear and the ring gear.

Then, the processing proceeds to Step S124, in which the rotation of the pinion gear 14 is started by energizing the starter motor 17. In Step S129 (see FIG. 5), the engine is restarted by cranking.

When it is determined in Step S122 that the engine rpm Nr is larger than the meshing-engagement allowing rpm $Nr_2$, the processing proceeds to Step S125, in which the rotation of the pinion gear 14 is started by energizing the starter motor 17.

In Step S126, the rpm-difference threshold value Ndiff for determining a timing at which the pushing of the pinion gear 14 is started is determined.

Then, in Step S127, an rpm difference between the engine rpm Nr and the pinion-gear rpm Np and the rpm-difference threshold value Ndiff determined in Step S126 are compared with each other. If the rpm difference is smaller than the threshold value Ndiff, the processing proceeds to Step S128, in which the plunger 15 is moved by energizing the solenoid 16 to push out the pinion gear 14 so as to achieve the meshing engagement between the pinion gear and the ring gear. In Step S127, when the rpm difference between the engine rpm Nr and the pinion-gear rpm Np is equal to or larger than the threshold value Ndiff, the processing returns to Step S126 so as to repeat Steps S126 and S127 until the rpm difference becomes smaller than the threshold value Ndiff.

Figure 6:
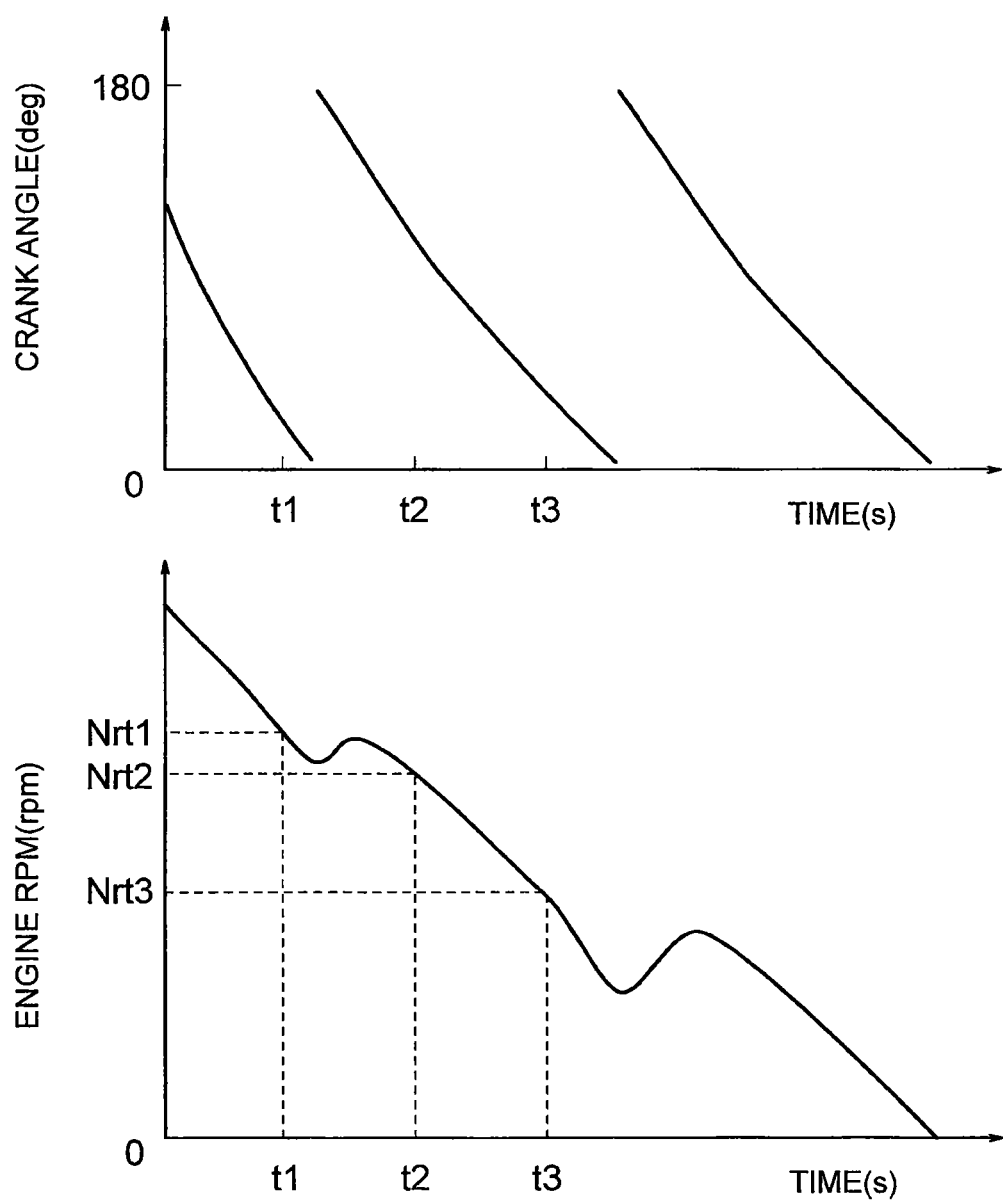
FIG. 6 are schematic graphs showing an engine rpm and a crank angle when the rpm of an engine drops by the rotation by inertia from the start of an idle stop, in Embodiment 1 of the present invention.

Here, the details of determination of the threshold value Ndiff in Step S126 are described with reference to FIGS. 6, 7, and 8.

The threshold value Ndiff is determined based on the data tables Tb1 and Tb2 which prestore data of whether or not the engine rpm and the pinion rpm change during a predetermined delay from the start of pushing of the pinion gear 14, that is, during a delay time period to the abutment.

This embodiment has a configuration in which the amount of change in the engine rpm during the delay time period to the abutment is determined by the engine rpm and the crank angle and a change in the pinion-gear rpm during the delay time period to the abutment is determined by the time from the start of energization of the starter motor. FIG. 6 are graphs of the crank angle and the engine rpm during the rotation by inertia, which is caused by the start of the idle stop. For example, in the case where the pushing of the pinion gear 14 is started at a time t1, the pinion gear comes into abutment against the ring gear at a time t2 with a predetermined delay, that is, delay time period to the abutment. Meanwhile, the engine rpm is lowered from Nrt1 to Nrt2.

On the other hand, in the case where the pushing of the pinion gear 14 is started at the time t2, the pinion gear comes into abutment against the ring gear at a time t3. The engine-rpm change amount in the meantime becomes Nrt3 from Nrt2. Here, the delay time period from the start of the pushing of the pinion gear to the abutment against the ring gear is determined by a speed of movement of the pinion gear, and is therefore substantially constant (specifically, t2−t1≈t3−t2). However, even though the delay time periods have substantially the same length as shown in FIG. 6, the amount of reduction from Nrt2 to Nrt3 is larger as compared with the amount of reduction from Nrt1 to Nrt2.

This is because there are the effects of torque pulsations by the passage through a compression TDC of any one of cylinders in the time period between t1 and t2, whereas the engine-rpm change amount in the time period between t2 and t3 during which the torque pulsations are not present becomes large.

The data table Tb1 for determining the engine-rpm change amount by using the engine rpm and the crank angle as inputs is shown as Table 1.

TABLE 1

|  | | Crank angle (deg) | | | | | | |
|---|---|---|---|---|---|---|---|---|
|  | | 0 | 30 | 60 | 90 | 120 | 150 | 180 |
| Engine rpm (rpm) | 200 | 100 | 140 | 190 | 250 | 300 | 300 | 300 |
|  | 400 | 100 | 130 | 170 | 220 | 250 | 300 | 300 |
|  | 600 | 100 | 120 | 150 | 180 | 220 | 250 | 250 |

Based on the data table Tb1, the engine-rpm change amount is determined from the engine rpm and the crank angle at the time of processing (at the start of S126). Specifically, when the threshold value is determined in Step S126, in the case where, for example, the engine rpm is 600 rpm and the crank angle is 60 degrees, the engine-rpm change amount is determined as 150 rpm. Then, the engine-rpm change amount is added to a pinion-gear rpm change amount described below, and hence the threshold value is determined.

Moreover, in the case where, for example, the engine self-recoverable rpm $Nr_1$ is small and therefore the engine rpm is not required to be taken into consideration (for example, when a difference between the engine self-recoverable rpm $Nr_1$ and the meshing-engagement allowing rpm $Nr_2$ is small), only the crank angle may be used as the input. In this case, for example, a table for the engine rpm of 400 rpm as shown in Table 2 may be used.

TABLE 2

| Crank angle (deg) | 0 | 30 | 60 | 90 | 120 | 150 | 180 |
|---|---|---|---|---|---|---|---|
| Engine-rpm change amount (rpm) | 100 | 130 | 170 | 220 | 250 | 300 | 300 |

On the contrary, only the engine rpm may be used as the input so as to obtain the engine-rpm change amount.

In this manner, the capacity of the data table Tb1 becomes smaller than in the case where a double-input table with the crank angle and the engine rpm is provided. Therefore, a necessary memory amount can be reduced.

Therefore, the degree of change in engine rpm during the delay time period to the abutment is determined depending on the number of engine revolutions during the delay time period to the abutment and whether or not an interval of the torque pulsation is contained in the delay time period to the abutment. Specifically, through inputting of the engine rpm (the number of engine revolutions during the delay time period to the abutment) at the time of processing (at the start of S126) and the crank angle (whether or not the interval of the torque pulsation is contained in the delay time period to the abutment) at the time of processing (at the start of S126) to the data table Tb1, the engine-rpm change amount is determined.

Figure 7:
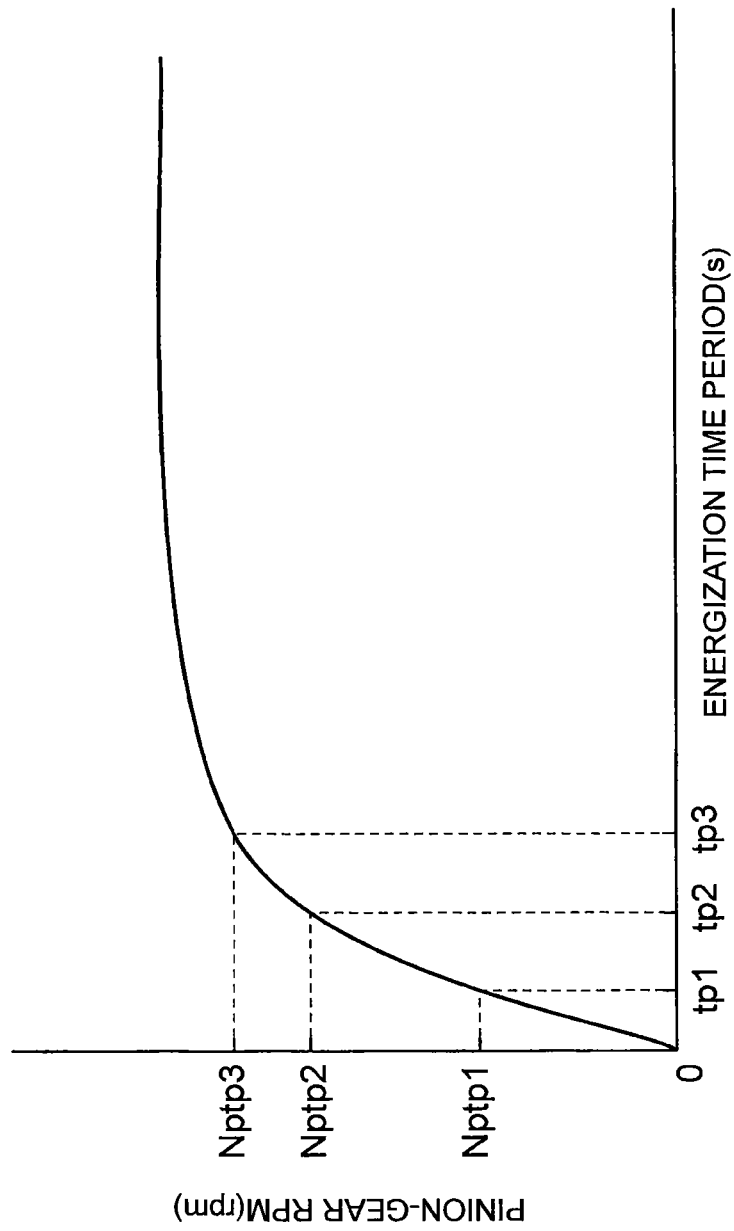
FIG. 7 is a schematic graph showing a time period and a pinion-gear rpm after the energization of a starter motor is started in Embodiment 1 of the present invention.

Next, FIG. 7 is a graph showing the relationship between a time period from the start of energization of the starter motor (hereinafter, referred to as "energization time period") and the pinion-gear rpm, and shows rising characteristics of the starter motor 17. For example, in the case where the pushing of the pinion gear 14 is started at a time tp1, the pinion gear comes into abutment against the ring gear at a time tp2 with the delay time period to the abutment. Meanwhile, the pinion-gear rpm increases from Nptp1 to Nptp2.

On the other hand, in the case where the pushing of the pinion gear 14 is started at the time tp2, the abutment against the ring gear is achieved at a time tp3 with the delay time period to the abutment. The pinion-gear rpm change amount in the meantime changes from Nptp2 to Nptp3, which is smaller as compared with the increase from Nptp1 to Nptp2 as shown in FIG. 7. This is due to an increase in counter electromotive force, caused by the increased rpm with elapse of time, or the like. Therefore, by the pinion-gear rpm at the time at which the pushing of the pinion gear 14 is started, the degree of change in pinion-gear rpm is determined during the delay time period to the abutment.

Figure 8:
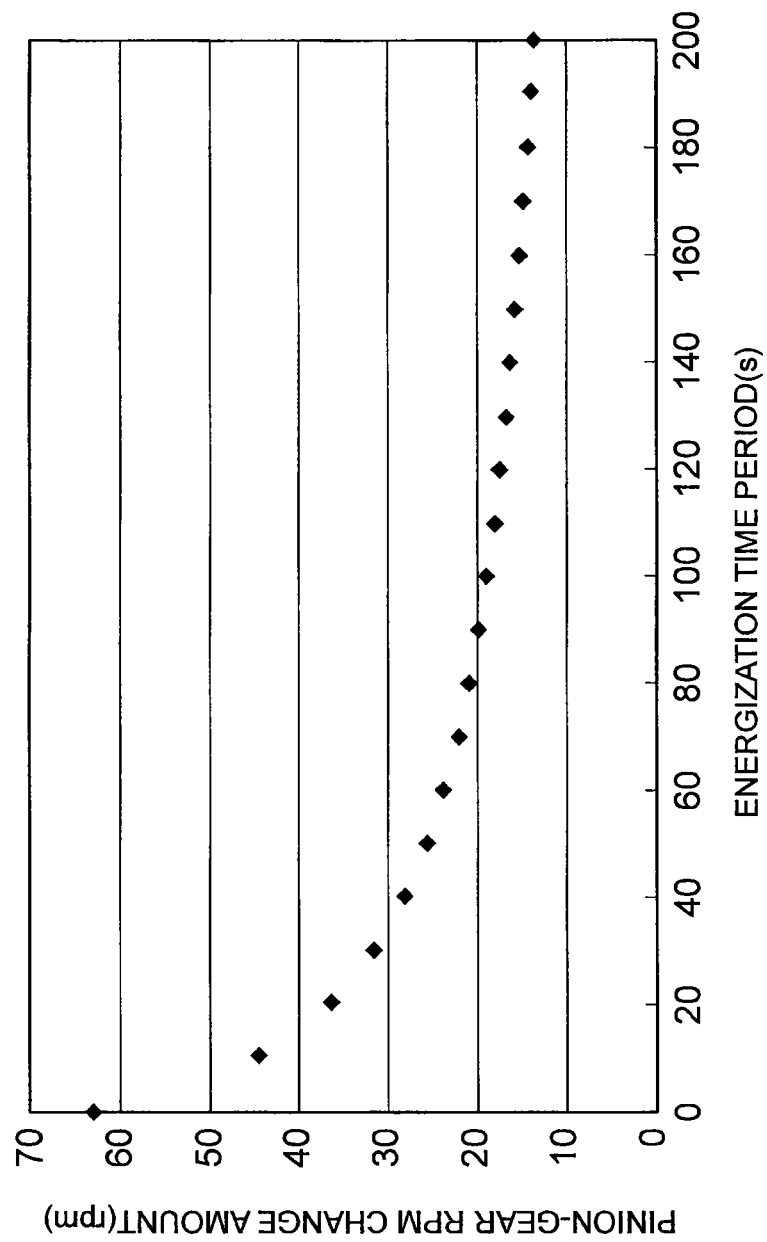
FIG. 8 is a graph showing an example of a data table of an energization time period and a pinion-gear rpm change amount in Embodiment 1 of the present invention.

Here, the data table Tb2 having the energization time period as an input and the pinion-gear rpm change amount as an output is as shown in FIG. 8. A horizontal axis of FIG. 8 is the elapsed time from the start of the energization, whereas a vertical axis is the pinion-gear rpm change amount at the time of processing (step S123). Specifically, when the threshold value is determined in Step S126, for example, at a time at which 90 milliseconds have elapsed from the start of energization, the pinion-gear rpm change amount is 20 rpm. Then, the pinion-gear rpm change amount is added to the engine-rpm change amount described above, and hence the threshold value is determined.

Therefore, from the engine rpm, the crank angle, and the energization time period at the time point at which the pushing of the pinion gear 14 is started, the degree of change in rpm difference during the delay time period to the abutment of the gears is determined based on the data tables Tb1 and Tb2. Therefore, the rpm difference at the time of abutment becomes smaller to enable smooth meshing engagement. Specifically, through changing of the threshold value with each of the inputs of the data tables, the threshold can be selected in accordance with conditions to enable the achievement of smooth meshing engagement of the gears. Then, in Step S129, the engine is restarted by cranking.

As described above, in Embodiment 1, the following are provided: the engine ECU for commanding the satisfaction of the idle-stop conditions; the ring gear to be coupled to the crankshaft of the engine; the starter motor for starting the engine; the pinion gear for transmitting the rotation of the starter motor to the ring gear; the rpm-difference acquiring means for acquiring the rpm difference between the pinion gear and the ring gear; the pinion-gear meshing-engagement means for moving the pinion gear to achieve the meshing engagement with the ring gear; and the restart control means for starting the energization of the starter motor when the engine rpm is at least the predetermined rpm at which the meshing engagement between the ring gear and the pinion gear can be achieved without rotating the starter motor and for allowing the pinion gear to be moved by the pinion-gear meshing-engagement means when the rpm difference between the pinion gear and the ring gear, which is acquired by the rpm-difference acquiring means, becomes smaller than the threshold value. The restart control means includes threshold-value setting means, and the threshold value corresponding to characteristics input to the threshold-value setting means is preset.

According to Embodiment 1, the rpm-difference threshold value Ndiff is determined from the engine rpm, the crank angle, and the energization time period based on the data tables Tb1 and Tb2. Therefore, the threshold value can be selected in accordance with conditions, for example, so that the meshing engagement corresponding to the torque pulsation can be realized. Accordingly, the engine can be smoothly restarted. Moreover, a mechanism required for the energization with speed governing and a computation for predicting the future engine rpm and pinion-gear rpm are not required.

Although the data tables Tb1 and Tb2 are used as the threshold-value setting means in this embodiment, a function using the crank angle and the engine rpm as inputs may be used in place of the data tables. For example, the threshold value may be set by using a function obtained by spline interpolation of the data table Tb1 shown in Table 1 or the like.

Although the three inputs, that is, the engine rpm, the crank angle, and the energization time period, are used as inputs to the data table Tb1, the inputs are not necessarily limited to the aforementioned three. For example, the pinion-gear rpm may be acquired from an rpm sensor or an rpm table corresponding to the voltage or the current so that the pinion-gear rpm is used as the input to the data table Tb2 in place of the energization time period. In this manner, the timer is not required to be provided. Further, the rpm difference between the engine rpm and the pinion-gear rpm can be more precisely acquired. As a result, smooth meshing engagement can be realized.

Although the threshold value Ndiff is determined by using the data tables T1b and Tb2, the correction factor may be determined by another input so as to correct the threshold value Ndiff as described below.

For example, the threshold value Ndiff is determined by setting movement characteristics of the pinion gear, which include the delay time period to the abutment against the ring gear from the start of the pushing of the pinion gear 14 and an acceleration of pushing. However, the movement characteristics of the pinion gear change in some cases depending on a state of a battery, a current flowing through the solenoid, or the like.

Figure 9:
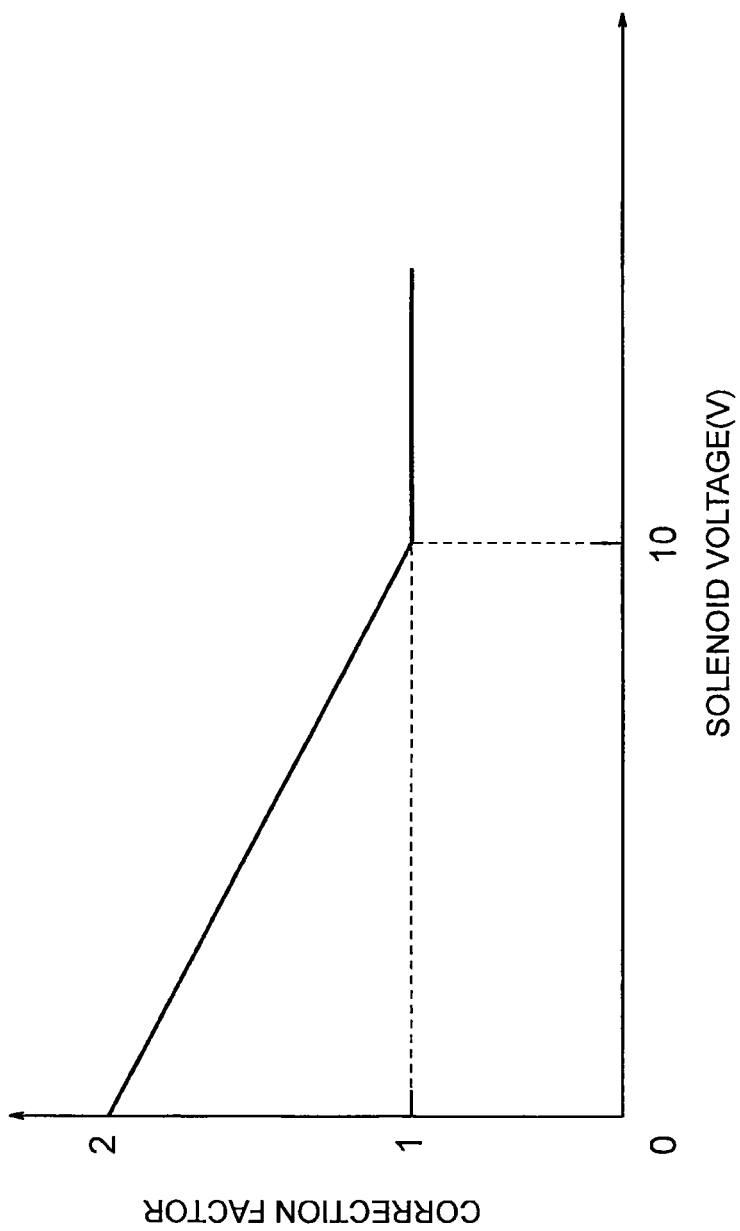
FIG. 9 is a graph showing an example of a data table of a correction factor when a voltage applied to a solenoid changes in Embodiment 1 of the present invention.
Figure 10:
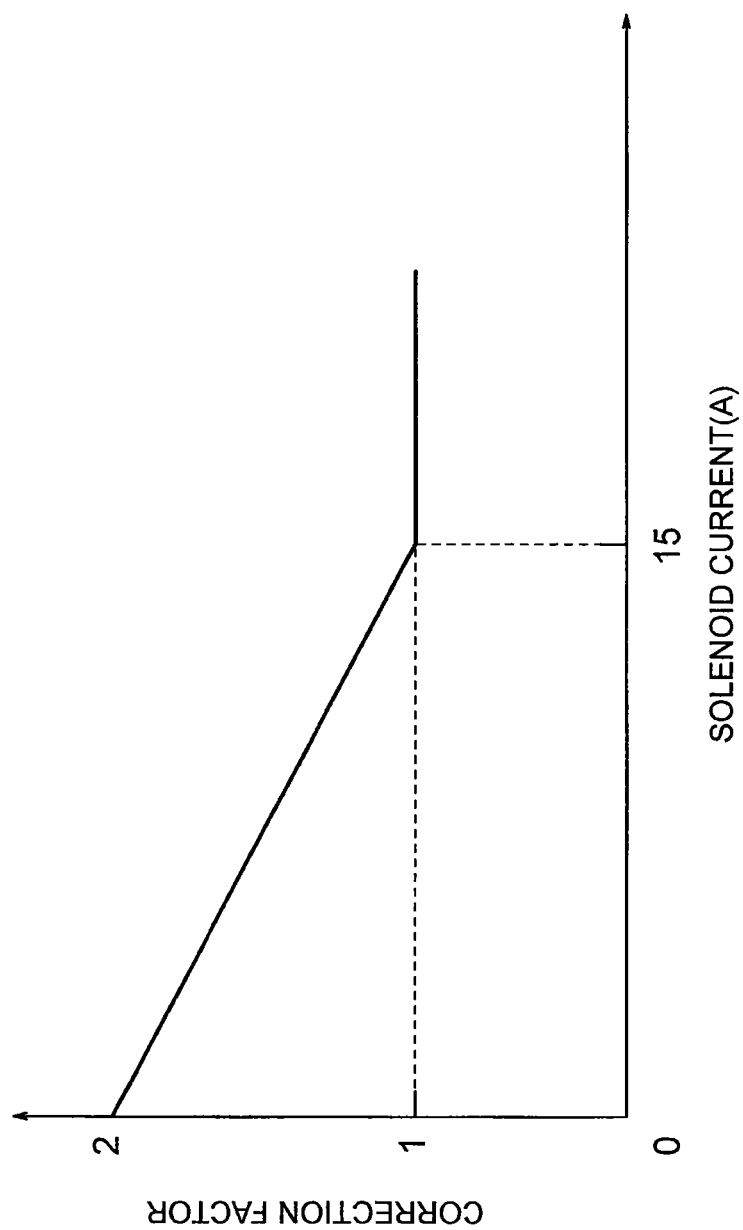
FIG. 10 is a graph showing an example of a data table of a correction factor when a solenoid current changes in Embodiment 1 of the present invention.
Figure 11:
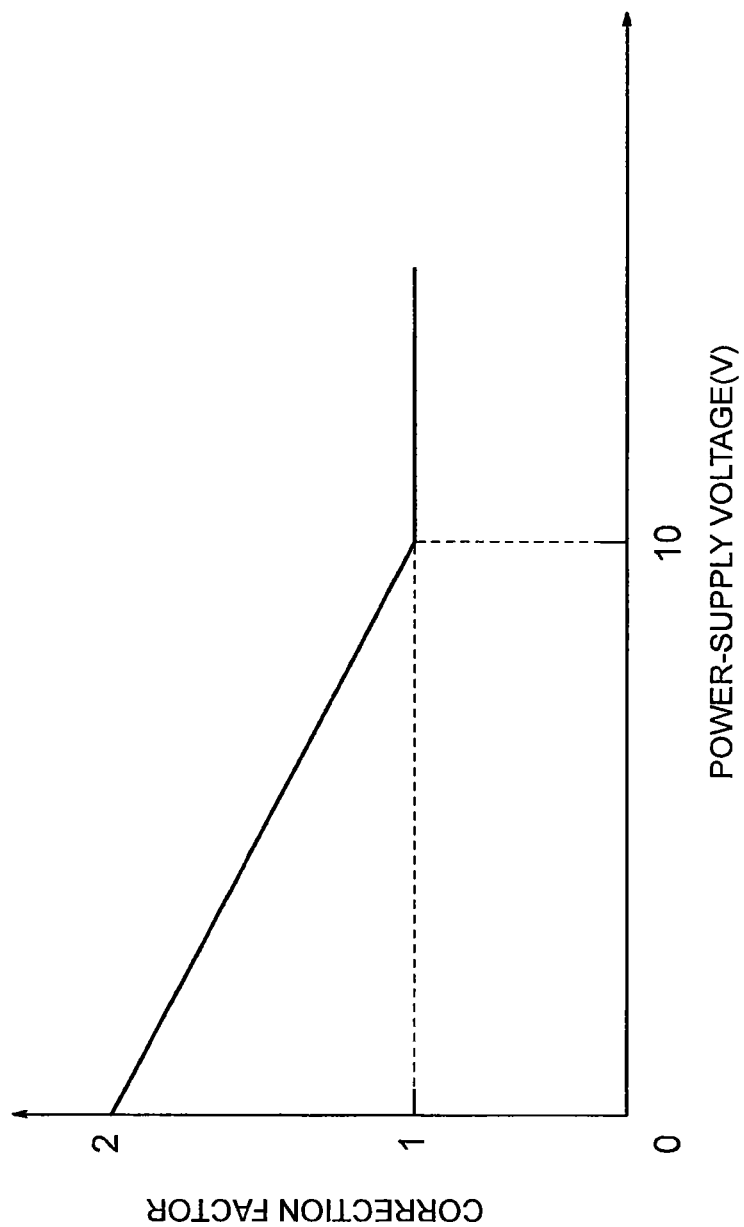
FIG. 11 is a graph showing an example of a data table of a correction factor when a power-supply voltage changes in Embodiment 1 of the present invention.

Therefore, the threshold value Ndiff may be determined from the engine rpm, the crank angle, and the energization time period. Then, solenoid-voltage detecting means for detecting a voltage applied to the solenoid 16, solenoid-current detecting means for detecting a current flowing through the solenoid 16, or power-supply voltage detecting means for detecting a power-supply voltage is provided so as to determine the correction factor as illustrated in FIGS. 9, 10, and 11 respectively, by using the detected voltage applied to the solenoid, current flowing through the solenoid, or power-supply voltage as the input. Then, the threshold value may be corrected by dividing the threshold value determined by the data tables Tb1 and Tb2 by the correction factor. In this manner, through the correction of the threshold value by using the voltage applied to the solenoid, the current flowing through the solenoid, or the power-supply voltage as input, smooth meshing engagement which is not affected by the voltage applied to the solenoid, the current flowing through the solenoid, or the power-supply voltage can be realized even when the movement characteristics of the pinion gear change.

Further, for example, in the case where a gear range in which a torque from the engine is transmitted to a tire is selected, when the idle stop is performed while the vehicle is running, a rotary torque is transmitted from a part other than the engine, such as a torque converter, to the engine side by traveling inertia of the vehicle or the like. As a result, a rotational acceleration of the engine changes, to thereby change the engine-rpm change amount in some cases. Therefore, transmitted-torque detecting means for detecting the rotary torque transmitted to the engine side may be provided to correct the engine-rpm change amount determined from the data table Tb1 based on the detected transmitted torque. More specifically, vehicle-speed detecting means for detecting a vehicle speed, master-cylinder pressure detecting means for detecting a master-cylinder pressure of the brake, or acceleration detecting means for detecting a longitudinal acceleration of the vehicle may be provided so as to correct the engine-rpm change amount determined from the data table Tb1 based on the detected vehicle speed, master-cylinder pressure of the brake, the longitudinal acceleration, or the like. In this manner, the effects of the vehicle speed and the longitudinal acceleration of the vehicle are taken into consideration so that the smooth meshing engagement can be realized even when the rotary torque is transmitted from the part other than the engine to the engine side.

Figure 12:
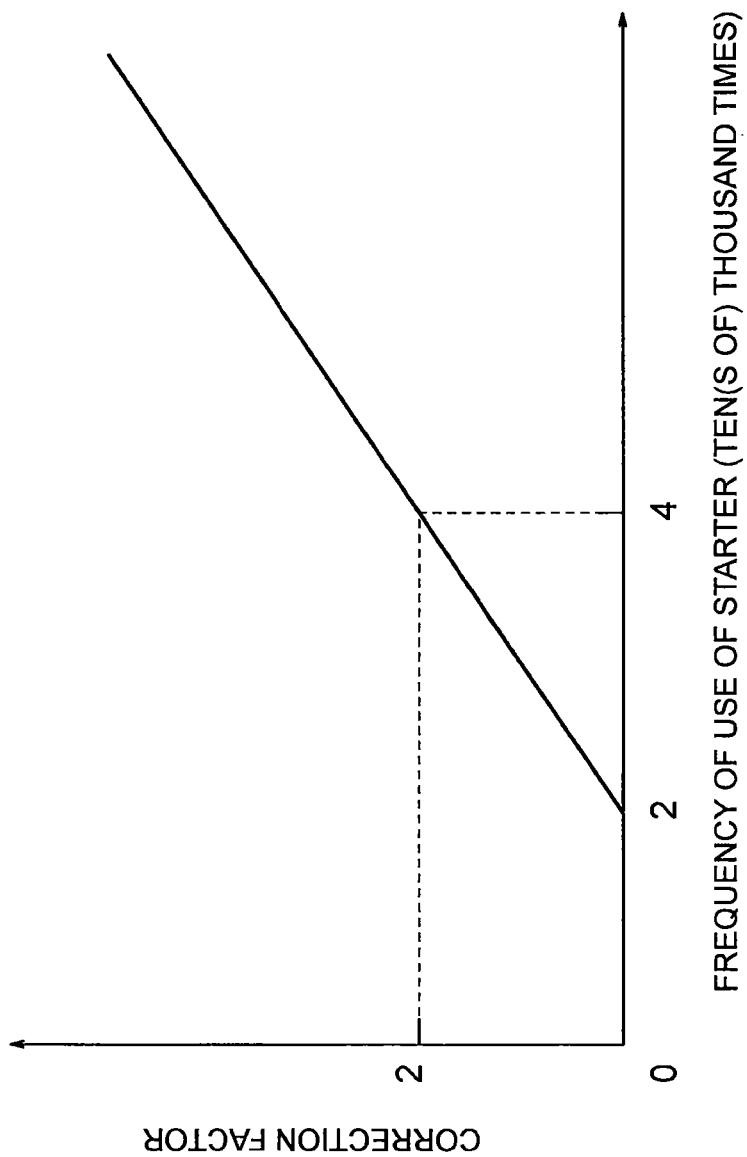
FIG. 12 is a graph showing an example of a data table of a correction factor when the starter changes with elapse of time in Embodiment 1 of the present invention.

Moreover, the pinion-gear rpm change amount changes in some cases because the rising characteristics of the starter motor change due to degradation with time, a reduction in power-supply voltage, or the like. Therefore, motor rising-characteristic detecting means for detecting the rising characteristics of the starter motor may be provided so as to correct the pinion-gear rpm change amount determined by the data table Tb2 based on the detected motor rising-characteristic. More specifically, a counter for detecting a frequency of use of the starter motor may be provided so that the detected frequency of use is used as an input to the data table Tb1. As shown in FIG. 12, a correction factor is obtained from the frequency of use of the starter. Then, the pinion-gear rpm change amount described above is divided by the correction factor so as to obtain a pinion-gear rpm change amount in the case of degradation with time. For example, when the frequency of use is forty thousand times, the correction factor is 2. The pinion-gear rpm change amount in the case of degradation with time is half of that during a normal operation. Alternatively, detection means for detecting the power-supply voltage, the voltage applied to the starter motor, or the current flowing through the starter motor may be provided so as to correct the pinion-gear rpm change amount determined by the data table Tb2 based on the result of detection. In this manner, the smooth meshing engagement without being affected by the degradation with time, a reduction in power-supply voltage, or the like can be realized.

In the manner described above, the rpm difference threshold value can be set in accordance with running conditions, the current, the voltage, or the like to enable smoother meshing engagement.

Figure 13:
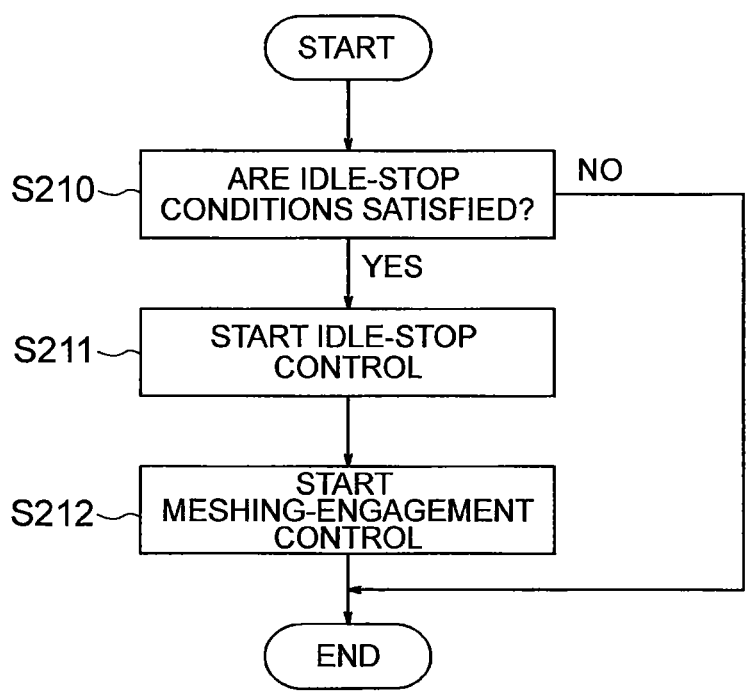
FIG. 13 is a flowchart illustrating a flow of the idle-stop control according to Embodiment 1 of the present invention.
Figure 14:
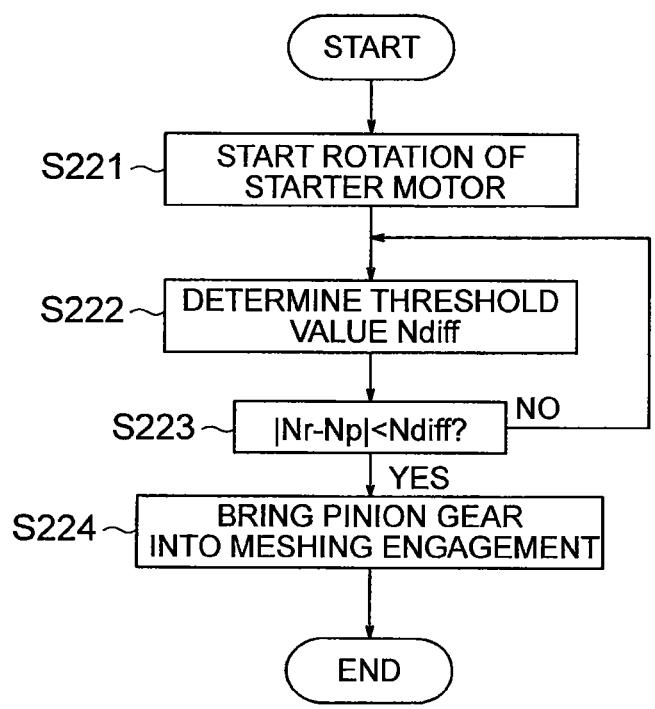
FIG. 14 is a flowchart illustrating a flow of meshing-engagement control according to Embodiment 1 of the present invention.

Moreover, as the processing performed in the controller 13 and the engine ECU 10, as illustrated in the flowcharts of FIGS. 13 and 14, in response to the satisfaction of the idle-stop conditions from the engine ECU 10, the energization of the starter motor 17 may be immediately started without waiting for the satisfaction of the restart condition.

As illustrated in FIG. 13, first, as in the case described above, whether or not the idle-stop conditions are satisfied is determined in the engine ECU 10 (S210). When the idle-stop conditions are not satisfied, the processing proceeds to a next control cycle. When the idle-stop conditions are satisfied in Step S210, the idle-stop control is started (S211) so that the fuel supply to the engine is stopped by the control of the engine ECU 10. Then, the processing proceeds to Step S212, in which the control for bringing the pinion gear and the ring gear into meshing engagement is started.

Next, meshing-engagement control is described with reference to FIG. 14.

First, in Step S221, the rotation of the pinion gear 14 is started by energizing the starter motor 17.

Then, in Step S222, the rpm-difference threshold value Ndiff for determining the timing at which the pushing of the pinion gear 14 is started is determined in accordance with the same procedure as that of Embodiment 1.

Then, in Step S223, the rpm difference between the engine rpm Nr and the pinion-gear rpm Np and the rpm-difference threshold value Ndiff determined in Step S222 are compared with each other. When the rpm difference is smaller than Ndiff, the processing proceeds to Step S224, in which the plunger 15 is moved by energizing the solenoid 16 to push out the pinion gear 14 so as to bring the pinion gear and the ring gear into meshing engagement.

In Step S223, when the rpm difference between the engine rpm Nr and the pinion gear rpm Np is equal to or larger than Ndiff, the processing returns to Step S222 so that Steps S222 and S223 are repeated until the rpm difference becomes smaller than the threshold value Ndiff.

As described above, based on the satisfaction of the idle-stop conditions, the rotation of the starter motor is started so as to bring the gears into meshing engagement. As a result, a state in which the engine can be restarted by cranking can be realized at an earlier time.

The invention claimed is:

1. An engine starting device for an automatic idle-stop system for performing an idle stop when an idle-stop condition is satisfied, the engine starting device comprising:
    a ring gear to be coupled to a crankshaft of an engine;
    a starter motor for starting the engine;
    a pinion gear for transmitting rotation of the starter motor to the ring gear;
    rpm-difference acquiring means for acquiring an rpm difference between the pinion gear and the ring gear;
    a crank angle detector;
    a pinion-gear actuator for moving the pinion gear to achieve meshing engagement with the ring gear; and
    restart control means for allowing the pinion gear to be moved by the pinion-gear actuator when the rpm difference between the pinion gear and the ring gear, which is acquired by the rpm-difference acquiring means, becomes smaller than a threshold value,
    wherein the restart control means comprises threshold-value setting means that sets the threshold-value according to the crank angle detected by the crank-angle detector.

2. An engine starting device according to claim 1, wherein the threshold-value setting means determines the threshold value by using a data table.

3. An engine starting device according to claim 2, wherein the restart control means starts energizing the starter motor based on the satisfaction of the idle-stop condition when an engine rpm is equal to or larger than a predetermined rpm.

4. An engine starting device according to claim 2,
    wherein the engine starting device is to be used for the automatic idle-stop system for restarting the engine based on satisfaction of a restart condition after the satisfaction of the idle-stop condition, and
    wherein the restart control means starts energizing the starter motor based on the satisfaction of the restart condition when an engine rpm is equal to or larger than a predetermined rpm.

5. An engine starting device according to claim 2, further comprising a timer for detecting a time period from start of energization of the starter motor or pinion-gear rpm acquiring means for acquiring an rpm of the pinion gear,
    wherein the threshold-value setting means uses, as an input, at least the detected time period from the start of the energization of the starter motor or the rpm of the pinion gear.

6. An engine starting device according to claim 5, further comprising a timer for detecting a time period from start of energization of the starter motor,
   wherein the rpm of the pinion gear is estimated from the time period from the start of the energization of the starter motor.

7. An engine starting device according to claim 2, further comprising engine-rpm detecting means for detecting an engine rpm,
   wherein the threshold-value setting means uses the detected engine rpm as an input.

8. An engine starting device according to claim 2, further comprising transmitted-torque detecting means for detecting a rotary torque transmitted from a part other than the engine to the engine in a period in which a vehicle is running,
   wherein the threshold value output from the threshold-value setting means is corrected based on the rotary torque.

9. An engine starting device according to claim 2, further comprising motor rising-characteristic detecting means for detecting rising characteristics of the starter motor,
   wherein the threshold value output from the threshold-value setting means is corrected based on rising characteristics of the starter motor detected by the motor rising-characteristic detecting means.

10. An engine starting device according to claim 2, further comprising means for estimating a time period required for meshing engagement, the means estimating a time period required for the pinion-gear actuator to move the pinion gear to achieve the meshing engagement with the ring gear,
    wherein the threshold value output from the threshold-value setting means is corrected based on the time period required for the meshing engagement, which is estimated by the means for estimating a time period required for meshing engagement.

11. An engine starting device according to claim 1, wherein the threshold-value setting means determines the threshold value by using a function.

12. An engine starting device according to claim 11, wherein the restart control means starts energizing the starter motor based on the satisfaction of the idle-stop condition when an engine rpm is equal to or larger than a predetermined rpm.

13. An engine starting device according to claim 11,
    wherein the engine starting device is to be used for the automatic idle-stop system for restarting the engine based on satisfaction of a restart condition after the satisfaction of the idle-stop condition, and
    wherein the restart control means starts energizing the starter motor based on the satisfaction of the restart condition when an engine rpm is equal to or larger than a predetermined rpm.

14. An engine starting device according to claim 11, further comprising a timer for detecting a time period from start of energization of the starter motor or pinion-gear rpm acquiring means for acquiring an rpm of the pinion gear,
    wherein the threshold-value setting means uses, as an input, at least the detected time period from the start of the energization of the starter motor or the rpm of the pinion gear.

15. An engine starting device according to claim 14, further comprising a timer for detecting a time period from start of energization of the starter motor,
    wherein the rpm of the pinion gear is estimated from the time period from the start of the energization of the starter motor.

16. An engine starting device according to claim 11, further comprising engine-rpm detecting means for detecting an engine rpm,
    wherein the threshold-value setting means uses the detected engine rpm as an input.

17. An engine starting device according to claim 11, further comprising transmitted-torque detecting means for detecting a rotary torque transmitted from a part other than the engine to the engine in a period in which a vehicle is running,
    wherein the threshold value output from the threshold-value setting means is corrected based on the rotary torque.

18. An engine starting device according to claim 11, further comprising motor rising-characteristic detecting means for detecting rising characteristics of the starter motor,
    wherein the threshold value output from the threshold-value setting means is corrected based on rising characteristics of the starter motor detected by the motor rising-characteristic detecting means.

19. An engine starting device according to claim 11, further comprising means for estimating a time period required for meshing engagement, the means estimating a time period required for the pinion-gear actuator to move the pinion gear to achieve the meshing engagement with the ring gear,
    wherein the threshold value output from the threshold-value setting means is corrected based on the time period required for the meshing engagement, which is estimated by the means for estimating a time period required for meshing engagement.

* * * * *